United States Patent [19]

Wohld

[11] Patent Number: 5,174,152
[45] Date of Patent: Dec. 29, 1992

[54] POWER OPERATED VALVE STEM THRUST VERIFICATION TEST SYSTEM

[76] Inventor: Peter R. Wohld, 2 S. 580 Ashley Dr., Glen Ellyn, Ill. 60137

[21] Appl. No.: 665,295

[22] Filed: Mar. 6, 1991

[51] Int. Cl.$^5$ .......................................... G01M 19/00
[52] U.S. Cl. ....................................... 73/168; 364/510
[58] Field of Search ................... 73/168; 364/509, 510

[56] References Cited

U.S. PATENT DOCUMENTS

| | | | |
|---|---|---|---|
| 4,570,903 | 2/1986 | Crass | 73/168 X |
| 4,693,113 | 9/1987 | McNennamy et al. | 73/168 |
| 4,694,390 | 9/1987 | Lee | 364/510 X |
| 4,831,873 | 5/1989 | Clarbonneau et al. | 73/168 |
| 4,869,102 | 9/1989 | Hale et al. | 73/168 |
| 5,033,012 | 7/1991 | Wohld | 364/551.01 |

Primary Examiner—Daniel M. Yasich
Attorney, Agent, or Firm—John H. Shurtleff

[57] ABSTRACT

A method and apparatus for inducing a controlled, axial load on the stem of a rising-stem, power-operated valve; and for testing the operator response in driving the valve stem against the load. The induced load is controlled both in magnitude and rate while data is collected to determine the operator's mechanical efficiency and its stem load handling capability. The methods, apparatus, and data collected can be used both for intial operator testing and for a periodic test and surveillance program for installed valve operators.

6 Claims, 1 Drawing Sheet

POWER OPERATED VALVE STEM THRUST VERIFICATION TEST SYSTEM

The present invention relates to apparatus and methods for testing the operator of a rising-stem, power-operated valve. More particularly, the present invention relates to apparatus and methods for inducing a controlled mechanical load on the valve stem and monitoring the operator response to determine its capability to drive the stem against the induced load.

A motor-operated valve provides one example of a power-operated valve. Data is collected during a stroke of the valve stem while being driven by the motor-operator against an induced load. The data is analyzed and evaluated to 1) determine the mechanical condition of the operator and its efficiency in converting motor torque to valve stem thrust, 2) extrapolate test results to predict operator behavior beyond test conditions, and 3) establish baseline conditions for later use in periodic surveillance testing and data trending for detecting motor-operator thrust capability degradation.

The invention is primarily directed to solving limitations with existing field test systems, but features of the invention can also be applied to shop or laboratory environments.

BACKGROUND OF THE INVENTION

A number of motor-operated valve test equipment patents have been issued in recent years, reflecting an industry interest in this area. The interest recently increased for testing at nuclear power plants because of the U.S. Nuclear Regulatory Commission's Generic Letter 89-10, Safety-Related Motor-Operated Valve Testing and Surveillance, issued Jun. 28, 1989, with three subsequent supplements. The generic letter relates to the Commission's concern for motor-operated valve operability and requests nuclear power plant license holders to increase their testing commitment to motor-operated valves.

In NUREG/CR-5558, "Generic Issue 87: Flexible Wedge Gate Valve Test Program," January 1991, the Commission reports much higher valve stem thrust requirements than previously expected necessary to operate gate valves under high fluid system differential pressure conditions. In the same report, pages 54–59, what is now called the "rate of loading" effect, is also discussed. The effect is related to use of a motor-operator torque switch commonly used in the United States and elsewhere in an operator manufactured by the Limitorque Corporation. The switch is used for stopping the operator motor on reaching a setpoint that limits the mechanical output of the operator.

In describing this rate of loading effect, the Commission reports, on page 54, that the stem force at torque switch trip is greater when the valve stem is loaded at a faster rate and further indicates that this effect is not yet fully understood. Unfortunately, commonly used test systems are used to adjust the motor-operator torque switch under high rates of loading; but, under required use of the valve to perform a fluid control function, stem loads are changed more slowly as the stem moves in the desired direction. Hence, operator testing results in a higher expectation of thrust output than actually available for use in operating a valve when it is needed.

This rate of loading effect, coincident with the higher than expected valve stem thrust requirement for fluid flow control noted in the same report, represents a divergence between requirements and capability. The condition has actually been recognized in the industry for over two years and needs to be addressed, particularly for valves that perform an important safety function as commonly found in a nuclear power plant.

Existing diagnostic test systems are used on rising-stem, motor-operated valves to set the torque switch to trip and de-energize the operator motor at a specific value of stem thrust. The thrust is measured either by direct or indirect means involving measurements taken when the stem is loaded very rapidly:

1) as the valve closure element is driven tightly into the valve seat, a characteristic use of R. L. Leon, U.S. Pat. No. 4,805,451, 2) on driving the valve stem downward into a load cell which blocks further travel, as with O. G. Crass, U.S. Pat. No. 4,570,903, or 3) on driving the valve stem upward into a load cell as with J. A. McNennamy, et. al., U.S. Pat. No. 4,693,113.

It is a characteristic associated with using all three of the test systems represented by these patents that the upper limit of the load is controlled by control means within the valve operator, the rate of loading is not controlled, and the rate is very high relative to normal loads developed when using the valve to control fluid flow.

It would normally be desired to increase the torque switch setpoint to compensate for this effect when using test systems subject to the rate of loading problem; but, the effect has not appeared to be readily quantifiable to allow adjustment. Additionally, existing systems that use valve seating or a load cell to develop thrust can result in the final thrust going significantly past the torque switch trip point. This is a result of the mechanically rigid nature of the equipment under test conditions, the time it takes for the operator motor controller to de-energize the motor after the desired stem load is achieved, and the motor inertia. Hence, the upward adjustment of the torque switch is limited by the same test technique that causes the need for it.

There currently is no commercial system available for testing and adjusting the torque switch that avoids the rate of loading problem. This includes the patented systems already noted.

Another solution might involve avoiding the problem by adopting a motor-operator control scheme that is not dependent on use of the typical torque switch. This could be through bypassing the switch in the region of stem travel where high stem thrusts are expected or eliminating it altogether as a control element. However, these same test systems, as noted above, generally depend on an operator torque switch to limit the induced stem load during testing. Hence, the torque switch and available test equipment exist in a symbiotic relationship where operator testing is prescribed, making the choice of eliminating the torque switch normally unacceptable.

In addition to the rate of loading problem, further review of the current art indicates a need to:

1) more realistically simulate the motor-operator function of driving the valve stem against a mechanical load, 2) allow collecting data under quasi static load conditions to better determine operator mechanical condition and efficiency, detect problems developing, and obtain test data adequate to allow an extrapolation of results to an extended range of operating conditions, 3) provide meaningful data for later comparison and trending in a periodic test or surveillance program.

An obvious solution for applying a controlled load for the purpose of testing might include a hydraulic cylinder and piston, and such devices have been and still are used successfully, but in special test applications and studies. Other devices might be used as well, including a spring having the desired travel and spring rate or a pneumatic cylinder and piston. There has been no known successful attempt, however, to adapt such loading means to a test methodology that can be used routinely in the field to resolve the rate of loading problem or for the advantages noted above.

SUMMARY OF THE INVENTION

The present invention is directed toward overcoming the limitations of the prior art by providing methods and apparatus that can be used for testing a valve operator against a load controlled by the apparatus while collecting data for further evaluation of the operator performance. Briefly stated, the apparatus of the invention includes a loading device for inducing a controlled axial load on a power-operated, rising stem valve, with means for determining the induced load magnitude and controlling the rate, assembled in a unit and mounted in such a manner that test data can be obtained over the loaded portion of the valve stroke without requiring the use of operator control to limit the load magnitude.

One of the special features of the invention includes a special adapter to simply and accurately obtain data for determining operating speed of the operator as the stem load is changed. Further features and use of the invention will be come apparent below.

There are a range of embodiments that can be conceived for the invention, each having different advantages. To address the most immediate needs of the industry, a portable device is needed to test installed motor-operators. It needs to be based on sound principles and minimize the possibility of surprises such as occurred with existing test systems related to the rate of loading effect.

To this purpose, the best currently conceived embodiment of the invention is an apparatus and methods for portable testing of a rising-stem valve motor-operator, incorporating the use of a hydraulic cylinder and piston in a compact unit with special features that enhance its practical use in the field. The hydraulic cylinder is mounted on a plate which is in turn mounted by suitable means to the operator. The valve stem is in line with and facing the piston rod. The piston rod is extended to meet the valve stem and is in line with it. As the operator is exercised to move the valve stem toward the cylinder, the piston is inserted into the cylinder. During this time the flow from the high pressure side of the cylinder is restricted by controlling the needle valve so any desired force, within equipment design limits, is induced on the stem as it moves toward the piston. Test data is collected during the stem travel under load for use in analyzing and evaluating operator conditions and thrust output capability.

It is an object of the present invention to provide a method and apparatus for field testing power-operators for rising-stem valves. It is envisioned that features of the invention will be used both for in situ testing of an operator and for shop testing an operator that has been removed for maintenance or repair. Motor-operators are one example of the operator type of interest.

It is an object of one embodiment of the invention to provide a method and apparatus for user control of the stem loading device for adjustment to any mechanical load, within the capability of the equipment, and at any rate to simulate realistic valve stem loading conditions that will demonstrate operator capability without errors introduced by collecting data at high rates of loading.

Another object of the invention is to correct data and analyses previously done with test equipment subject to the high rate of loading effect. One means of doing this is by loading the valve stem slowly in one direction until the torque switch trips. This gives the value of thrust at torque switch trip in that direction, unaffected by high rates of loading. The value of thrust at torque switch trip in the other direction is then corrected by a ratio of the new to old values of thrust at torque switch trip in the tested direction.

It is another object of the invention to provide a method and apparatus for motor-operator testing that is not limited by the affects of either motor inertia or motor contractor dropout time after the desired operator thrust capability is measured.

It is another object of the invention to provide a method and apparatus for providing a load that can be more accurately measured and more simply related to basic physical principles that minimize the magnitude and potential for possible error in methodology for data collection, analysis, and evaluation.

It is yet another object of one embodiment of the invention to provide a method and apparatus that loads the valve stem in the opening direction and demonstrates operator capability in stem travel regions whether or not limited by a torque switch setting.

It is still another object of the invention to provide a method and apparatus that allows the collection of motor-operator data under controlled load conditions in a manner that can be used to determine the operator motor torque to stem thrust conversion over a range of loads, detect degraded conditions, obtain test data adequate to allow an extrapolation of results to an extended range of interest, and to collect data for later comparison and trending in a periodic test of surveillance program.

It is another object of the invention to provide a method and apparatus for monitoring and timing a parameter related to motor-operator motion that is simple in principle and can be used to accurately determine operator motor speed.

It is another object of the invention to provide a method and apparatus for loading the valve stem that uses a completely self contained hydraulic loading device, free of any high pressure accumulator, hydraulic pump, and associated hose connections.

It is another object of one embodiment of the invention to provide a method and apparatus that does not require any mechanical connection between the load inducing device and valve stem, thereby reducing complications in adapting the invention to different valve stem and operator geometries.

It is another object of one embodiment of the invention to provide a method and apparatus for extending a hydraulic piston rod toward the valve stem by means of using a small air pump (such as a bicycle tire pump), thereby avoiding a more troublesome hydraulic pump and reservoir system for portable use.

Another object of one embodiment of the invention is to provide a permanently mounted loading device for, possibly a spring or mechanical snubber, that would eliminate the need to periodically mount a temporary load. The device could be used at the end of valve stroke or be activated remotely to keep it from interfering with normal valve stroking. For a motor-operator, this would enable remote measurements such as current, power, phase angle, etc., to be made to assess the operator condition without requiring access to a physical location of an installed valve. This would reduce the need for personnel to be present for testing a valve in a remote or hazardous area.

Another object of one embodiment of the invention is to control the load automatically through the use of a powered load control device. This can be used to improve or speed the data collection process.

It is a still further object of the present invention to provide a method and apparatus for more representative load testing of valve operators at minimal cost, and to thereby reduce the reasons for more expensive testing under design basis fluid system differential pressure conditions (that is also used to test a valve operator under load).

The foregoing and other objectives, features and advantages will be more readily understood upon consideration of the following detailed description of certain preferred embodiments of the invention, taken in conjunction with the accompanying drawings.

DETAILED DESCRIPTION OF THE PREFERRED EMBODIMENTS

Figure 1:
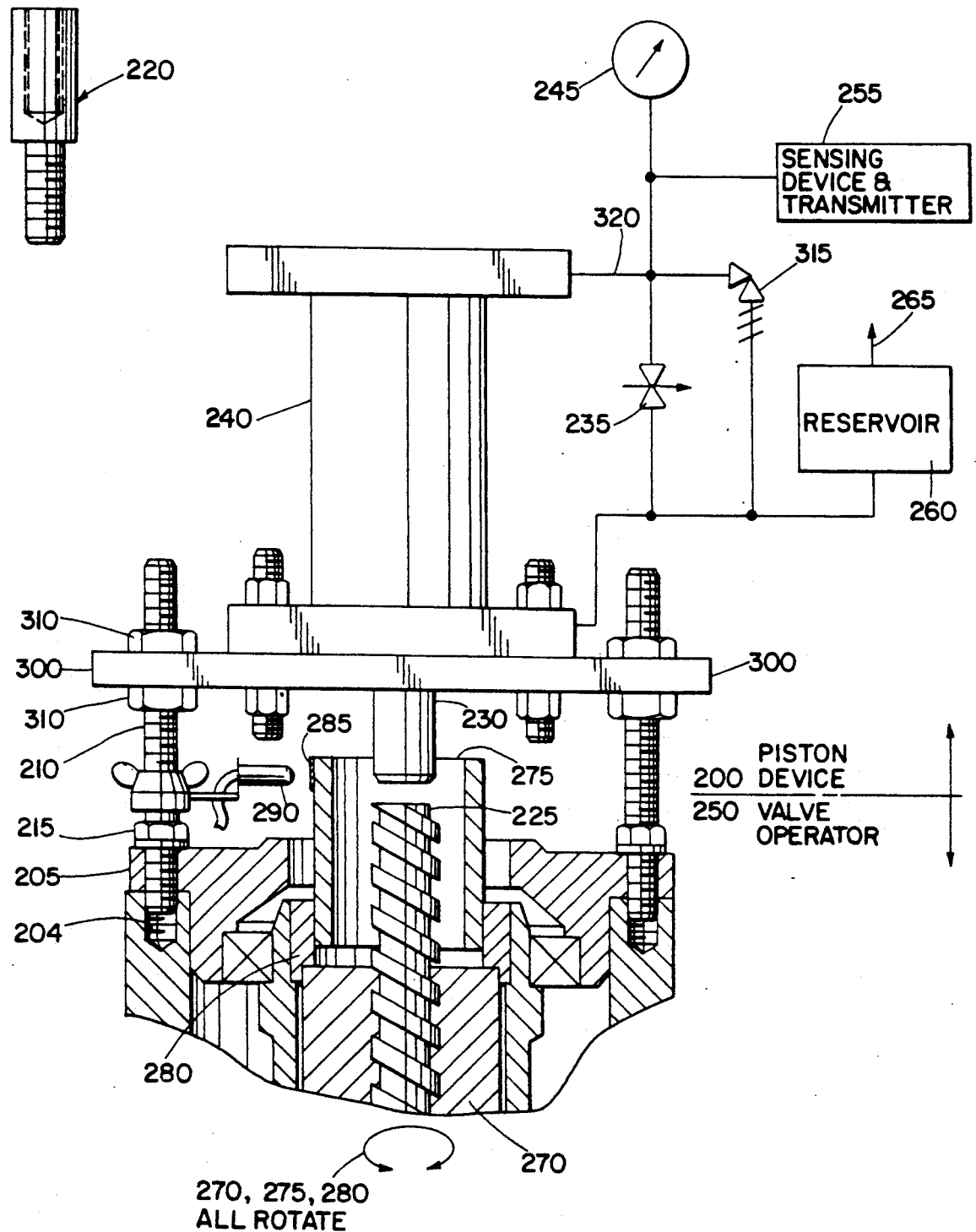
FIG. 1. A cut-away view of the upper portion of a typical motor-operator with one embodiment of the valve testing apparatus mounted above it.

The following is a description of the best presently contemplated mode of carrying out the invention. This description is not to be taken in a limited sense, but is presented for the purpose of describing the general principles of the invention. The scope of the invention should be determined with reference to the appended claims.

The best presently contemplated embodiment is with respect to current needs, particularly of the nuclear industry, for which the primary interest is with currently installed motor-operated valves and for a valve test system that is highly reliable and accurate. Hence, the embodiment described herein reflects this current interest by describing a portable system that is minimally intrusive to the operability existing equipment and is very direct in its approach with the potential for high accuracy.

Detailed drawings and descriptions of operating principles of the motor-operated, rising-stem valve are well documented in existing patents such as U.S. Pat. Nos. 4,690,003 and 4,805,451. Hence, it should suffice to state, with the aid of FIG. 1, that the typical valve operator 250 is normally mounted rigidly above the valve. The valve stem 225 extends from the valve body into the valve operator 250 and is moved up or down to provide the opening or closing of the valve. Axial motion of the valve stem 225 in the up or down direction is caused by rotation of the stem nut 270. The stem nut 270 is prevented from axial motion by the design of the valve operator 250 and the stem is prevented from rotation by the internal design of the valve. Hence, when the stem nut 270 is rotated by action of the operator 250, the stem 225 must move in the appropriate axial direction. Reversing rotation of the stem nut 270 causes the valve stem 225 to travel in the opposite direction.

The hydraulic piston device 200 is mounted axially concentric and above the valve stem 225 on a plate 300 that is, in turn, supported by threaded rods 210 and mounting nuts 310. The actual piston and cylinder unit shown as item 240 represents equipment typically available commercially. Support of the piston is similar to that shown for support of the load cell in FIG. 4 of U.S. Pat. No. 4,693,113. The cylinder unit 240 and all attached hydraulic lines 320 and equipment are filled with hydraulic fluid except for the reservoir 260 which is maintained partially full for reasons that are described in following paragraphs.

An optional adapter 220, shown in FIG. 1, can be used to facilitate periodic installation and removal of the piston device 200. It is used to replace fasteners that normally occupy the threaded holes 204 and hold down the upper bearing plate 215. Once the adapters 220 are in place, the threaded rod 210 is screwed into the top of the adapter 220 for mounting the piston device 200 without disturbing the upper bearing housing plate 205 fasteners. This enables mounting the piston device 200 without disturbing the mechanical integrity of the operator. This is important for a valve not readily removed from service for testing. It also makes installation of the piston device 200 less involved, which is important if the valve is in a hazardous area.

With the stem 225 below its normal limit of upward travel, the piston rod 230 is extended until it assumes a position ready to provide a mechanical load on the stem 225 when the stem is driven in the upward direction by rotation of the stem nut 270. It is not necessary for the piston rod 230 to extend fully to a position in contact with the valve stem 225 prior to loading the stem 225 on an upward stroke. This will limit the stem 225 to less than a full stroke under loaded conditions, but will still allow a significant portion of the stroke to occur under load, during which portion the operator characteristics can be monitored to achieve the test goals.

The advantage in the embodiment thus far described is that, while the stem 225 can not be loaded in tension as it moves downward and it may only be loaded for a partial stroke in compression as it moves upward, there is no special mechanical device needed to attach the stem 225 to the piston 230; the piston rod length and hydraulic cylinder 240 can be limited to reasonable dimensions for portability reasons; the allowed smaller dimensions of the hydraulic unit reduce potential interferences that may exist in structure surrounding an installed valve; and the practical use of the test apparatus is not defeated by complications with following the stem 225 into the operator on a downward stroke when this is made difficult by mechanical interference. Also, by adjusting the height of the mounting plate 300 on the threaded rod 210, the test apparatus 200 can be adjusted to allow a full, normal upward stroke of the valve stem 225 while the piston rod 230 is being pushed into the cylinder. Hence, this allows the valve to go its full normal stroke during testing and does not require using a valve operator control device or other special device to stop stem travel due to physical travel limits imposed by the test apparatus.

When the stem 225 is driven upward by the operator 250 against the piston rod 230, fluid from the top of the cylinder 240 is pressurized and wants to flow through needle valve 235 and into either the volume that is being increased in the lower side of the cylinder 240 or into the reservoir 260. The needle valve 235 is adjusted until the desired pressure is indicated on the pressure gage 245. This pressure corresponds to a force against the piston rod 230 equal to the product of the differential pressure across the upper and lower chambers of the cylinder 240 times the area across the inside diameter of the cylinder. The actual induced stem force will be slightly higher than the piston rod force determined using the pressure technique because of losses in the system including friction forces in the internal piston to cylinder seal and the piston rod seal.

An adjustable safety valve 315 is provided to limit the upper cylinder volume pressure and thereby limit the induced stem force in order to prevent equipment mechanical limits from being exceeded due to excessive closure of the needle valve 235. The safety valve 315 may also be used to control the pressure to achieve a desired stem force if the needle valve is maintained closed.

A sensing device and transmitter 255, contained in a single unit, senses the pressure in the upper cylinder volume. It is permanently attached to the piston device 200 for automatic pressure data collection and recording. It is also envisioned that the transmitter 255 can be used in an automated control scheme if the needle valve 235 is replaced with a suitable controllable device and control means are provided to complete the design.

The reservoir 260 provides several functions. It accommodates the net hydraulic fluid volume change associated with moving the piston rod 230 in or out of the cylinder volume. It also accommodates any hydraulic fluid volume changes due to thermal affects. The reservoir 260 is always maintained partially full of hydraulic fluid to assure that no air will enter the piston device 200 on the piston extension stroke that requires an outflow from the reservoir. The reservoir 260 is also sized to accommodate an insurge of fluid without spillage. This is assured by a minimum air volume in the reservoir.

A pneumatic valve 265, such as found on a bicycle tire, is used on the top of the reservoir 260 so the hydraulic fluid is not free to dump out while transporting or mounting the equipment. Enough air or gas volume is always provided for in the reservoir 260, besides preventing spillage, to prevent any significant buildup of pressure due to an insurge of fluid when the piston rod 230 travels into the cylinder.

During a test, it is desired that the reservoir 260 remain as close to 0 psig pressure as practical. This holds the low pressure side of the cylinder 240 at a low pressure and assures that the pressure gage 245 and the pressure transducer 255 will be measuring close to the actual differential pressure across the hydraulic cylinder 240. This low pressure can be assured by continuously venting valve 265 or by designing the air volume in the reservoir 260 so the buildup of pressure during a test cycle is negligible.

The reservoir 260 provides another function. A small air pump such as a bicycle tire pump, not shown, can be attached to the air valve 265 and used, with needle valve 235 open, to pressurize the reservoir 260 and force the piston rod 230 downward in readiness for an upward test stroke of the stem 225. This occurs when the upper and lower cylinder volumes are pressurized to the same pressure because the penetration of the piston rod through the lower cylinder housing results in a net downward hydraulic force on the piston. The advantage of the reservoir and air pump system is with avoiding the need for a heavier hydraulic pump and the necessary hose connections that would either make the portable unit heavier or would require temporary hydraulic connections to the pump for each valve test.

There are many parameters that can be monitored to advantage while the operator 250 is stroking the stem 225 against the load provided by the piston device 200. These might include motor current, voltage and power; motor rotation speed; stem velocity; etc.

For a number of reasons, it is desirable to know the motor RPM at a known value or range of values of induced stem load. This is difficult to do accurately, with a short data collection time, with an existing valve operator that does not have an access port to sense the motor rotation directly. One means is described below is relatively non-intrusive to the mechanical operation of the valve, can be installed without making the valve inoperable in the process, and can be used to determine motor speed from stem nut 270 cycle time.

A tube 275 with a high spot 285 is attached by friction fit to rotating member 280 that rotates in unison with the stem nut 270. This constitutes an extension of the rotating member for the purpose of facilitating instrumentation. As the tube rotates, proximity probe 290 monitors the rotation from an area less physically constraining than without the use of the tube 275. As the stem nut 270 rotates, the proximity probe 290 detects passes of the high spot 285. The signal from the probe 290 is monitored and recorded with a time based recording medium common in the industry. The stem nut cycle time is then determined from the recorded proximity probe data for one complete rotation of the high spot 285. The inverse of the cycle time, RPM of the stem nut, is then multiplied by the gear ratio of the motor-operator to determine the average RPM of the motor during the timed stem nut revolution.

A number of valve operator monitoring schemes can be considered including a more sophisticated device to measure instantaneous motor speed. This would lead to more sophisticated data and analysis possibilities. However, the embodiment described herein is sufficient, simpler, highly reliable and can be done very accurately.

An example of a more sophisticated device that could be used to advantage is a position sensing monitor for the hydraulic piston rod 230. Such a device is currently available commercially that comes integrally mounted on the top of the cylinder 240. The piston rod position information could be used to determine stem velocity which is also an indication of motor RPM. This may be the method of choice for some applications, but the technique relies on accurate information on the valve stem thread pitch and lead to determine motor RPM from stem speed. If the stem pitch and lead are known with sufficient accuracy, the integral piston rod position measurement would have some advantage in convenience and with continuous monitoring. It could also be used in combination with the proximity probe to gain the advantage of both systems.

With the embodiment described in FIG. 1, the tube 275 fits tightly against the stem nut lock nut 280 that rotates rigidly with the stem nut 270. The stem 225 and piston rod 230 are allowed to move up and down within the tube 275. Each time the stem nut 270 completes a full rotation, the proximity probe 290 generates a signal and the event is recorded by a time based recorder so that the stem nut 270 rotation cycle time can later be determined.

To use the equipment, the rotating tube 275 is inserted and the proximity probe mounted. Then, the piston device 200 is mounted as shown in FIG. 1 so that the valve stem 225 can achieve its full travel without reaching the travel limit of the piston rod 230. Threaded holes 204 already available in the operator housing bearing cap 205 are used to install the support rods 210 and tightened to the bearing cap 205 with nuts 215.

The valve stem 225 is operated to assume a position somewhere below its upward travel limit. The needle valve 235 is opened. An air pump is connected by any suitable means to the air valve 265 and used to pressurize the reservoir 260 to force the piston rod 230 downward to contact the valve stem 225, or as far as it will travel if the stem stroke exceeds the limit of the piston rod travel in this direction. The air pump is then removed and the reservoir 260 is de-pressurized to atmospheric pressure by venting air through valve 265.

Data recording instrumentation, not shown, is prepared to collect hydraulic pressure data from the pressure transducer 255 and stem nut cycle information from the proximity probe 290. The valve stem 225 is then stroked upward, pushing the piston rod 230 into the hydraulic cylinder 240 while data is collected. The needle valve 235 is throttled during this time to control the pressure in the upper cylinder 240. The pressure is maintained steady, increased or decreased to apply the desired force on the valve stem. The rate of loading is controlled, in both increasing and decreasing load directions, by controlling the rate at which the throttling is increased or decreased.

In a typical application, the needle valve 235 would be used to step up the pressure every time the proximity probe 290 senses a complete revolution under relatively constant pressure from the previous adjustment. This would continue until the desired upper limit of stem load was achieved, or if a motor-operator torque switch is involved, until the upper thrust limit at torque switch trip is achieved. The process can be repeated to collect additional data as desired. If a torque switch trips during the adjustment of the pressure, the approximate point can be noted and the same pressure approached more slowly on another run to determine the actual trip point under slow rate of loading conditions.

Once the data is collected, the equipment may be removed.

The collected data is then analyzed. First, the pressure data is converted to piston rod force and approximate stem load by multiplying the pressure by the internal cross sectional area of the hydraulic cylinder, with the knowledge that there is some error due to neglecting friction forces in the hydraulic unit and also due to not measuring the small buildup of pressure in the reservoir.

(It should be noted that all references herein to load on the valve stem are those added by the test apparatus. There is always a load on the stem from the valve that is not measured by the current invention. While it would be desirable to do so, the principal interest in testing with the current invention is to measure the additional load handling capability of the operator above what exists normally. The test system would detect unexpected high loads from the valve through a reduction in the load handling capability measured by the test system. An excessively high load could also be detected initially by evaluating the operator motor RPM at zero induced load from the test apparatus.)

With the stem load information, the proximity probe signal is analyzed to determine the cycle time under each separate load condition. The cycle time is then converted to cycles per minute and that value used to determine motor RPM by multiplying it by the operator gear ratio. The results of the analysis from each stem nut rotation at each induced load plateau are then plotted to show a curve of RPM versus Stem Thrust.

These results can be used further to show the stroke time changes to be expected for changes in valve load, using the inverse relationship between RPM and valve stroke time, such as addressed in patent application Ser. No. 07/314,477, now U.S. Pat. No. 5,033,012, by the current applicant. This is useful in relating changes in measured valve stroke times to actual valve mechanical conditions. For instance, a stroke time increase measured after tightening a valve packing can be related to an increased packing friction load and evaluated with respect to its impact on the valve operator.

Different approaches are possible to further evaluate the data. One approach is to use the operator motor "RPM versus Motor Shaft Torque" characteristics. These are normally provided in a graphical presentation and would be available either from existing motor vendor information or determined by a special test.

At each value of motor torque on a given motor-operator and valve stem there is a corresponding stem force expected according to engineering equations based on theory and experience. This can be used with the motor characteristics to predict the force imparted to the valve stem by an operator over a range of RPM values. This can then be compared to the experimentally determined RPM versus Stem Thrust curve to make an assessment of expected versus measured conditions.

Once the conversion of motor torque to stem thrust is known through the process of the above analyses, especially over a range of stem load conditions, estimates can be more accurately made of stem load handling capability during motor under-voltage conditions; stem loads at the condition of motor stall torque can also be predicted more accurately; and other extrapolations of the data are possible. Further, once the mechanical efficiency and capability of the operator are known, periodic testing can be performed to trend related operator parameters to either detect degradation occurring or quantify improvements after a maintenance evolution.

While the embodiment of the invention so far described has advantages of simplicity, it is not difficult to envision the value of automatically collecting and manipulating the data to perform the analyses noted, plot the data, trend it, and highlight any data representing conditions needing special attention. This would include the monitoring of additional parameters of interest as well.

Another embodiment of the invention of special interest is one that places a load on the valve stem in a permanent configuration. Monitoring at the motor control center, a considerable distance from the valve location, could then be effective in determining changes in the operator motor current signature, power, power factor, etc., to determine operator degradation occurring.

The advantages gained in using the piston instead of measuring an uncontrolled load developed as with current field test systems are:

1) There is no significant thrust increase due to motor contractor dropout time or inertial affect after the hydraulic load is increased to the limit allowed by the operator controls. Hence, the open torque switch can be set to the maximum thrust allowed by the mechanical limits of the equipment and can be tested to trip at that limit without exceeding it (within the limits of test system accuracy). This removes a penalty otherwise incurred when the torque switch must be tested into a rigidly mounted load.

2) The hydraulic load can be increased slowly to eliminate the rate of loading error in measuring thrust at torque switch trip to get a thrust limit under the slower rates of loading experienced under fluid system induced valve loads. The test results can be used to evaluate previous test data taken with test systems subject to the rate of loading error and, also, to determine corrections for thrust at torque switch trip for both opening and closing trips where the test data being evaluated is used in both directions.

3) The system does not depend on the operator driving the stem into a rigid load while simultaneously depending on the torque switch to stop the motor. The hydraulic loading system is capable of loading the stem when no torque switch is involved because the valve is allowed to run until the normal control switch deenergizes the motor at the normal completion of stem travel. This provides the flexibility of bypassing the torque switch and still being able to experimentally demonstrate the capability of the unit. Further, the data obtained can be extrapolated out beyond the test conditions by determining motor torque to stem thrust conversion characteristics in the test range and knowing the motor torque capability. The combination of operator control choice and test capability can thus be used to significantly add operating margin to the operator and to demonstrate it with test data.

4) The stem load determined by use of the hydraulic pressure measurement can be done with good accuracy, depending primarily on the accuracy of the pressure measurement and the accuracy with which the cylinder bore diameter is known. The calculated error of force from the pressure should be easily attainable within 1.0% except for losses in the hydraulic seal friction. Fortunately, this friction reduces the force determined from measuring the hydraulic cylinder pressure, causing the calculated stem force to be slightly less than actually present. This is expected to be a significantly improved accuracy over existing techniques in assuring a minimum operator stem thrust capability.

5) When testing an operator to torque switch trip, if the switch is broken or set too high, this can be discovered by the hydraulic unit before equipment mechanical limits are exceeded, but not so with the rigidly mounted load cell.

While the invention herein disclosed has been described by means of specific embodiments and applications thereof, numerous modifications and variations could be made thereto by those skilled in the art without departing from the spirit and scope thereof. Accordingly, it is therefore understood that within the scope of the appended claims, the invention may be practiced otherwise than as specifically described herein.

What is claimed is:

1. An apparatus and method for inducing a mechanical load to resist axial motion of an electric motor driven valve stem, wherein the load is induced in a controlled manner by the apparatus while the stem is moved axially against the load, and wherein both the rate of loading and magnitude of the induced load are controlled, and an actuating force is applied to the valve stem by a valve operator comprises of actuating means and a transmission assembly, and wherein the apparatus enables testing useful in determining the load handling characteristics of the valve operator, the apparatus comprising
    means for removably mounting said apparatus above the valve stem,
    means for applying a load to said valve stem,
    means for controlling and applied load, and
    means for determining the applied load; and
    wherein instrumentation means are provided for determining motor RPM or other parameter related to motor RPM, either directly or indirectly, while the valve stem is traveling under load.

2. The apparatus of claim 1 which includes s special device designed for attachment to a rotating member of the operator to facilitate said instrumentation means to determine motor RPM by detecting the rotary motion of said special device.

3. The apparatus and method of claim 1 wherein data is gathered during the inducing of the mechanical load and is used to relate valve operator motor RPM to valve stem load.

4. An apparatus and method for inducing a mechanical load to resist axial motion of an electric motor driven valve stem, wherein the load is induced in a controlled manner by the apparatus while the stem is moved axially against the load, and wherein both the rate of loading and magnitude of the induced load are controlled, and an actuating force is applied to the valve stem by a valve operator comprised of actuating means and a transmission assembly, and wherein the apparatus enables testing useful in determining the load handling characteristics of the valve operator, the apparatus comprising
    means for removably mounting said apparatus above the valve stem,
    means for applying a load to said valve stem,
    means for controlling the applied load, and
    means for determining the applied load; and
    wherein means are provided for mounting said apparatus without disturbing the normal valve operator fastening hardware, said mounting means comprising bolts having threads tapped into their heads to permit the installation of bolt extensions for supporting said apparatus above the adjacent said valve stem.

5. An apparatus and method for inducing a mechanical load to resist axial motion of an electric motor driven valve stem, wherein the load is induced in a controlled manner by the apparats while the stem is moved axially against the load, and wherein both the rate of loading and magnitude of the induced load are controlled, and an actuating force is applied to the valve stem by a valve operator comprised of actuating means and a transmission assembly, and wherein the apparatus enables testing useful in determining the load handling characteristics of the valve operator, the apparatus comprising means for removably mounting said apparatus above the valve stem,
means for applying a load to said valve stem,
means for controlling the applied load, and
means for determining the applied load; and
wherein said induced load is controlled to determine the valve stem thrust provided by said motor at a point of maximum torque under controlled rates of loading.

6. An apparatus and method for inducing a mechanical load to resist axial motion of an electric motor driven valve stem, wherein the load is induced in a controlled manner by the apparatus while the stem is moved axially against the load, and wherein both the rate of loading and magnitude of the induced load are controlled, and an actuating force is applied to the valve stem by a valve operator comprised of actuating means and a transmission assembly, and wherein the apparatus enable testing useful in determining the load handling characteristics of the valve operator, the apparatus comprising means for removably mounting said apparatus above the valve stem,
means for applying a load to said valve stem,
means for controlling the applied load, and
means for determining the applied load; and
wherein data collected using said apparatus is used to correct the analyses performed on data collected with other test systems that were used to collect data under higher rates of loading.

* * * * *

UNITED STATES PATENT AND TRADEMARK OFFICE
CERTIFICATE OF CORRECTION

PATENT NO. : 5,174,152

DATED : December 29, 1992

INVENTOR(S) : Peter R. Wohld

It is certified that error appears in the above-identified patent and that said Letters Patent is hereby corrected as shown below:

IN THE CLAIMS:

Column 12,

Claim 1, line 9 change "comprises" to --comprised--.

Claim 1, line 7 change "controlling and" to --controlling the--.

Claim 4, line 54 change "the" to --and--.

Claim 5, line 59 change "apparats" to --apparatus--.

Signed and Sealed this

Sixteenth Day of November, 1993

Attest:

BRUCE LEHMAN

Attesting Officer

Commissioner of Patents and Trademarks